United States Patent
Salour et al.

(10) Patent No.: US 9,477,858 B2
(45) Date of Patent: Oct. 25, 2016

(54) RESTRAINING SYSTEM INCLUDING NEAR FIELD RFID DETECTION

(71) Applicant: The Boeing Company, Chicago, IL (US)

(72) Inventors: Al Salour, St. Louis, MO (US); Douglas D. Trimble, St. Louis, MO (US); Jonathan B. Vance, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 14/040,533

(22) Filed: Sep. 27, 2013

(65) Prior Publication Data

US 2015/0090527 A1    Apr. 2, 2015

(51) Int. Cl.
*A62B 35/00* (2006.01)
*G06K 7/10* (2006.01)

(52) U.S. Cl.
CPC ........ *G06K 7/10009* (2013.01); *A62B 35/0025* (2013.01); *G06K 7/10396* (2013.01)

(58) Field of Classification Search
CPC ............. A62B 35/00; A62B 35/0025; G06K 7/10009; G06K 1/10396
See application file for complete search history.

(56) References Cited

U.S. PATENT DOCUMENTS

| | | | |
|---|---|---|---|
| 5,373,915 A | 12/1994 | Tremblay | |
| 6,265,983 B1 * | 7/2001 | Baillargeon | A62B 35/0037 340/673 |
| 7,151,454 B2 * | 12/2006 | Washington | G06K 7/10079 340/572.1 |
| 2007/0109134 A1 * | 5/2007 | Dugan | G07C 9/00111 340/573.1 |
| 2008/0021717 A1 | 1/2008 | Kaartinen et al. | |
| 2008/0021718 A1 | 1/2008 | Kaartinen et al. | |
| 2008/0021905 A1 | 1/2008 | Kaartinen et al. | |
| 2010/0026484 A1 | 2/2010 | King et al. | |
| 2010/0219015 A1 | 9/2010 | Meillet | |
| 2010/0231402 A1 * | 9/2010 | Flynt | G08B 19/00 340/679 |
| 2010/0271187 A1 * | 10/2010 | Uysal | G06K 7/0008 340/10.4 |
| 2011/0227748 A1 | 9/2011 | Schaible et al. | |
| 2012/0081214 A1 | 4/2012 | Alan | |
| 2012/0083350 A1 * | 4/2012 | Frankowski | A63G 31/00 472/128 |
| 2013/0057391 A1 | 3/2013 | Salvador et al. | |

FOREIGN PATENT DOCUMENTS

JP    2009 165517 A    7/2009

* cited by examiner

*Primary Examiner* — Charles A Fox
*Assistant Examiner* — Kristine Florio
(74) *Attorney, Agent, or Firm* — Miller, Matthias & Hull LLP

(57) ABSTRACT

A restraining system comprises a restraining device including first and second interlockable parts that, when interlocked, restrain the system. The restraining system further comprises a passive RFID tag attached to the first part, and a passive RFID reader coupled to the second part for near field detection of the tag within a prescribed range of the second part.

14 Claims, 4 Drawing Sheets

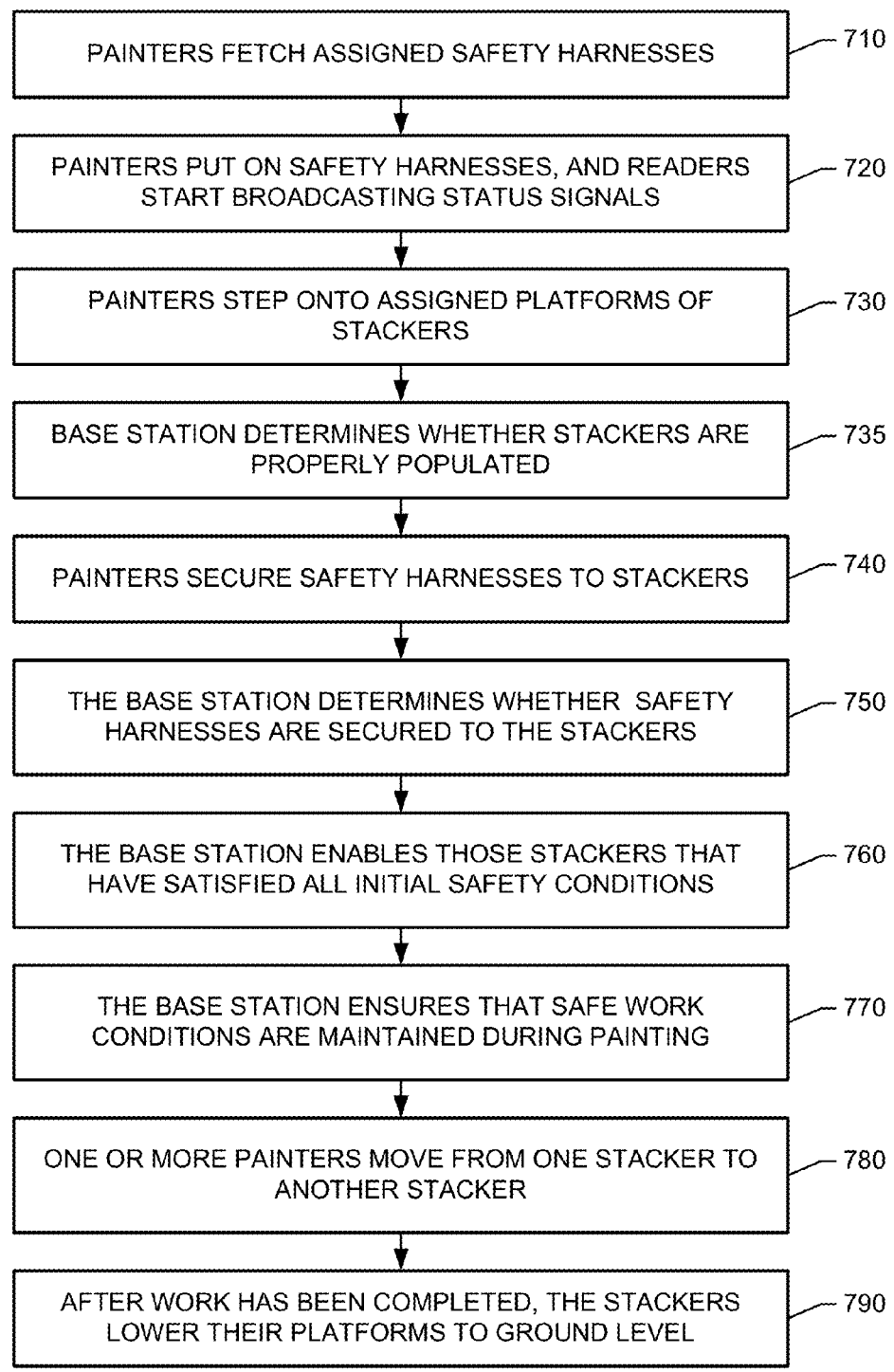

RESTRAINING SYSTEM INCLUDING NEAR FIELD RFID DETECTION

BACKGROUND

Elevated platforms may be equipped with safety harnesses and other fall restraints to ensure the safety of personnel working at elevated conditions. These personnel are usually responsible for securing their fall restraints. They are at risk if their fall restraints are not working properly, if they choose not to utilize their fall restraints, or if they forget to utilize their fall restraints.

Visual inspections may be performed to ensure that the fall restraints are working properly and that they are being utilized. However, visual inspections have limited value.

SUMMARY

According to an embodiment herein, a restraining system comprises a restraining device including first and second interlockable parts that, when interlocked, restrain the system. The restraining system further comprises a passive RFID tag attached to the first part, and a passive RFID reader coupled to the second part for near field detection of the tag within a prescribed range of the second part.

According to another embodiment herein, a platform system comprises a platform, and a plurality of restraining systems onboard the platform. Each restraining system includes a passive RFID tag and reader configured to perform near field detection of the tag to determine whether the restraining system is secured to the platform. The platform system further comprises an exciter for broadcasting an exciter identifier to the reader of each of the restraining systems. Each reader broadcasts a status signal indicating a reader identifier, the exciter identifier, and a secure status.

According to another embodiment herein, a method comprises performing near field RFID detection within a prescribed detection range of a first interlocking part of a safety harness, and indicating that the first part is interlocked with a second part at the end of a lanyard for as long as an RFID tag associated with the second interlocking part of is detected within the prescribed range.

These features and functions may be achieved independently in various embodiments or may be combined in other embodiments. Further details of the embodiments can be seen with reference to the following description and drawings.

BRIEF DESCRIPTION OF THE DRAWINGS

FIG. 7 is an illustration of a method of using the elevated platform system of FIG. 4 to paint an aircraft.

DETAILED DESCRIPTION

Figure 1:
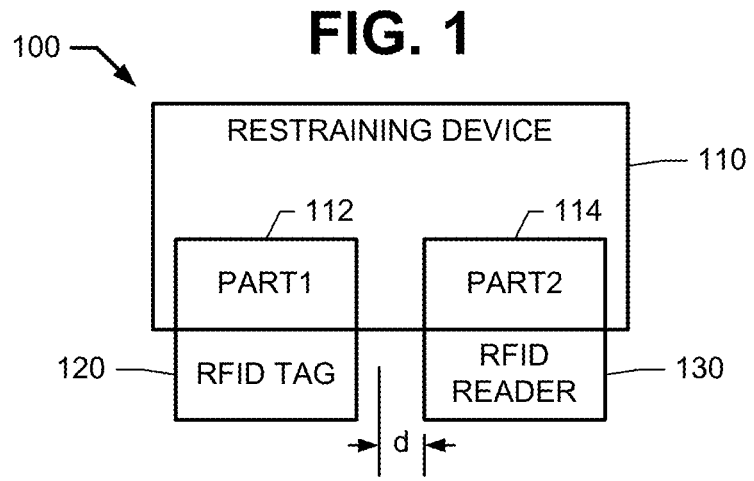
FIG. 1 is an illustration of a restraining system.

Reference is made to FIG. 1, which illustrates a restraining system 100. The system 100 includes a restraining device 110 having first and second interlockable parts 112 and 114 that, when interlocked, restrain the system 100. In some embodiments, the restraining device 110 may include an article of clothing.

The system 100 further includes a passive RFID tag 120 attached to the first interlockable part 112, and a passive RFID reader 130 coupled to the second part 114 for near field detection of the RFID tag 120 within a prescribed range of the second part 114. The tag 120 and the reader 130 are near-field in that radio frequency identification is performed within a prescribed detection range of just a few inches. As an example, the distance d equals about three to six inches (in other examples, the lower bound may be less than three inches, and/or the upper bound may be greater than six inches). If the tag 120 (and, therefore, the first part 112) is within the prescribed range, it is detected by the reader 130. If the tag 120 is detected, the first part 112 is assumed to be interlocked with the second part 114.

Detection of the tag 120 continues after the parts 112 and 114 have been interlocked. If the tag 120 is no longer detected, the parts 112 and 114 are assumed not to be interlocked.

The RFID reader 130 may be coupled to the second part 114 in a variety of ways. In some embodiments, the entire reader 130 is located next to the second part 114. In other embodiments, only an antenna of the RFID reader 130 is located next to the second part 114. In still other embodiments, the second part 114 functions as the antenna of the RFID reader 130.

Consider the following examples of a restraining system 100. As a first example, the restraining device 110 includes a safety harness having a D-ring (the second part 114). A snap hook (the first part 112) is at a free end of a lanyard. A fixed end of the lanyard is secured to a fixed object. When the snap hook and D-ring are interlocked, motion of a person wearing the safety harness is restrained.

The RFID tag 120 is attached to the snap hook at the free end of the lanyard, and the reader 130 is carried by the safety harness. The reader 130 performs near field detection within a prescribed range of the D-ring. When the RFID tag 120 is detected within the prescribed range of the second part 114, the first and second parts 112 and 114 are assumed to be interlocked. Once the tag 120 is no longer detected, the first and second parts 112 and 114 are assumed not to be interlocked.

A second example involves the safety harness without the lanyard. The second part 114 is mounted on a fixed object and interlocks with the first part 112, which is carried by the safety harness. The tag 120 is attached to first part 112, and the reader 130 is secured to the fixed object such that it performs near field detection within a prescribed range of the second part 114.

As a third example, the restraining device 110 includes a space suit. A fitting (the first part 112) on a free end of a tether is interlocked with a fitting (the second part 114) on the space suit. A fixed end of the tether is anchored to a space craft.

Figure 2:
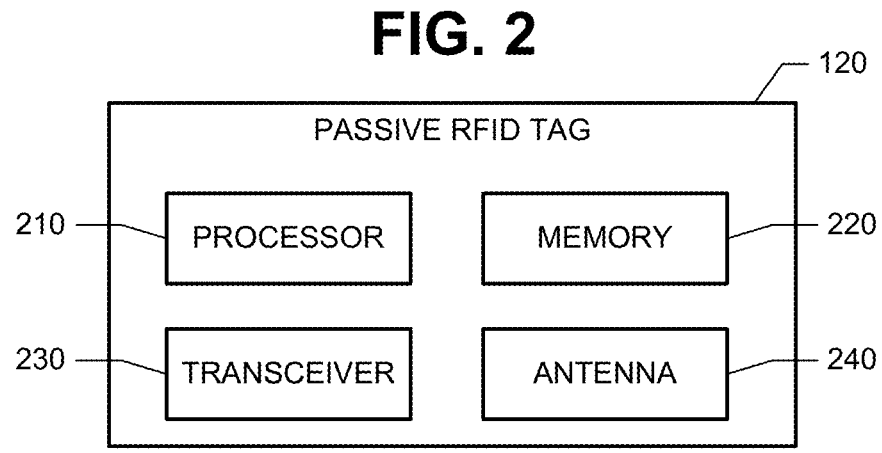
FIG. 2 is an illustration of a passive RFID tag.

Reference is now made to FIG. 2, which illustrates an example of the passive RFID tag 120. The tag 120 includes a processor 210, machine-readable memory 220, transceiver 230, and antenna 240. Operating power for the tag 120 may be harvested from the reader 130 or other external source (via, for example, RF backscatter activation). In some embodiments, however, the operating power may be provided by a battery or other internal source.

The memory 220 contains executable code for causing the tag 120 to respond to interrogations by the reader 130. When the tag 120 is interrogated by the reader 130, it may simply emit a wireless signal in periodic bursts, which bursts are referred to as "blink transmissions." Information encoded in the blink transmissions may include a unique identifier, such as an identifier corresponding to the restraining device 110.

The reader 130 may include a signal collector element and transceiver for sending operating power to the tag 120 and for receiving the blink transmissions from the tag 120. The reader 130 may also include a processor for processing the blink transmissions.

The antenna 240 of the tag 120 and the signal collector element of the reader 130 may be configured to communicate regardless of relative orientation of the tag 120 and the reader 130. The reader 130 sets the transmit power and adjusts gain to perform near field detection within the prescribed range.

Some environments may contain multiple restraining devices 110. Thus, these environments may include multiple RFID tags 120 and multiple RFID readers 130. A reader 130 operating at a detection range of only a few inches is likely not to detect RFID tags of other nearby restraining devices 110. Moreover, the detection ranges of the multiple readers 130 are likely not to overlap.

Figure 3:
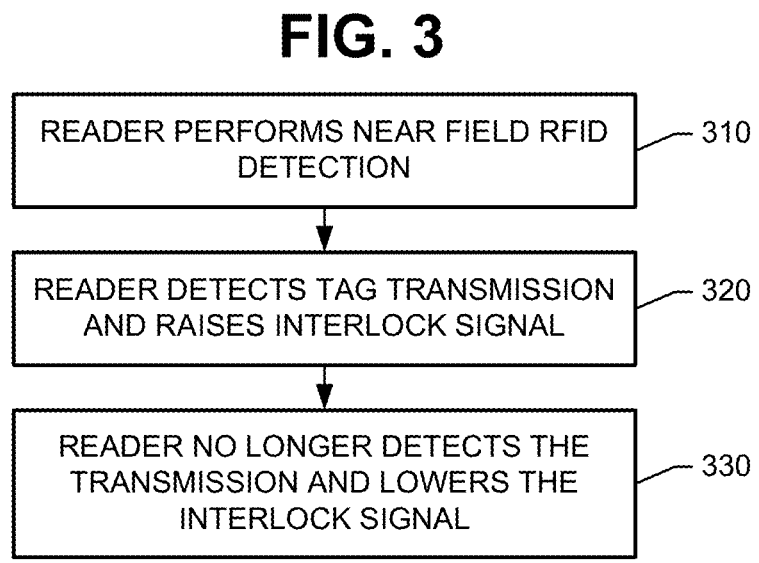
FIG. 3 is a method of operating the restraining system of FIG. 1.

Reference is now made to FIG. 3, which illustrates operation of the RFID reader 130. At block 310, the reader 130 performs near field RFID detection. If the tag 120 is not within the detection range of the reader 130, it will not generate a blink transmission.

The tag 120 is then moved within the prescribed range of the reader 130. For instance, the first part 112 is interlocked with the second part 114.

At block 320, the reader 130 detects blink transmissions from the tag 120. For as long as the blink transmissions are detected, the reader 130 raises an interlock signal indicating that the parts 112 and 114 are interlocked.

At block 330, once the reader 130 stops detecting blink transmissions, it lowers the interlock signal under the assumption that the parts 112 and 114 are no longer interlocked. In addition to lowering the interlock signal, the reader 130 may act immediately and in an appropriate manner. As but one example, the reader 130 may generate an audible sound signaling that the parts 112 and 114 are no longer interlocked.

The restraining system 100 may detect a non-interlocking condition without the need for visual inspection or the use of mechanical devices such as switches. The detection of a non-interlocking condition is non-contact and, therefore, is not subject to mechanical wear or failure. The restraining system 100 is more difficult to bypass or otherwise fool than mechanical devices.

The processor in the reader 130 can provide advantages beyond detecting an interlock condition. Some of these advantages will now be discussed in connection with an elevated platform system.

Figure 4:
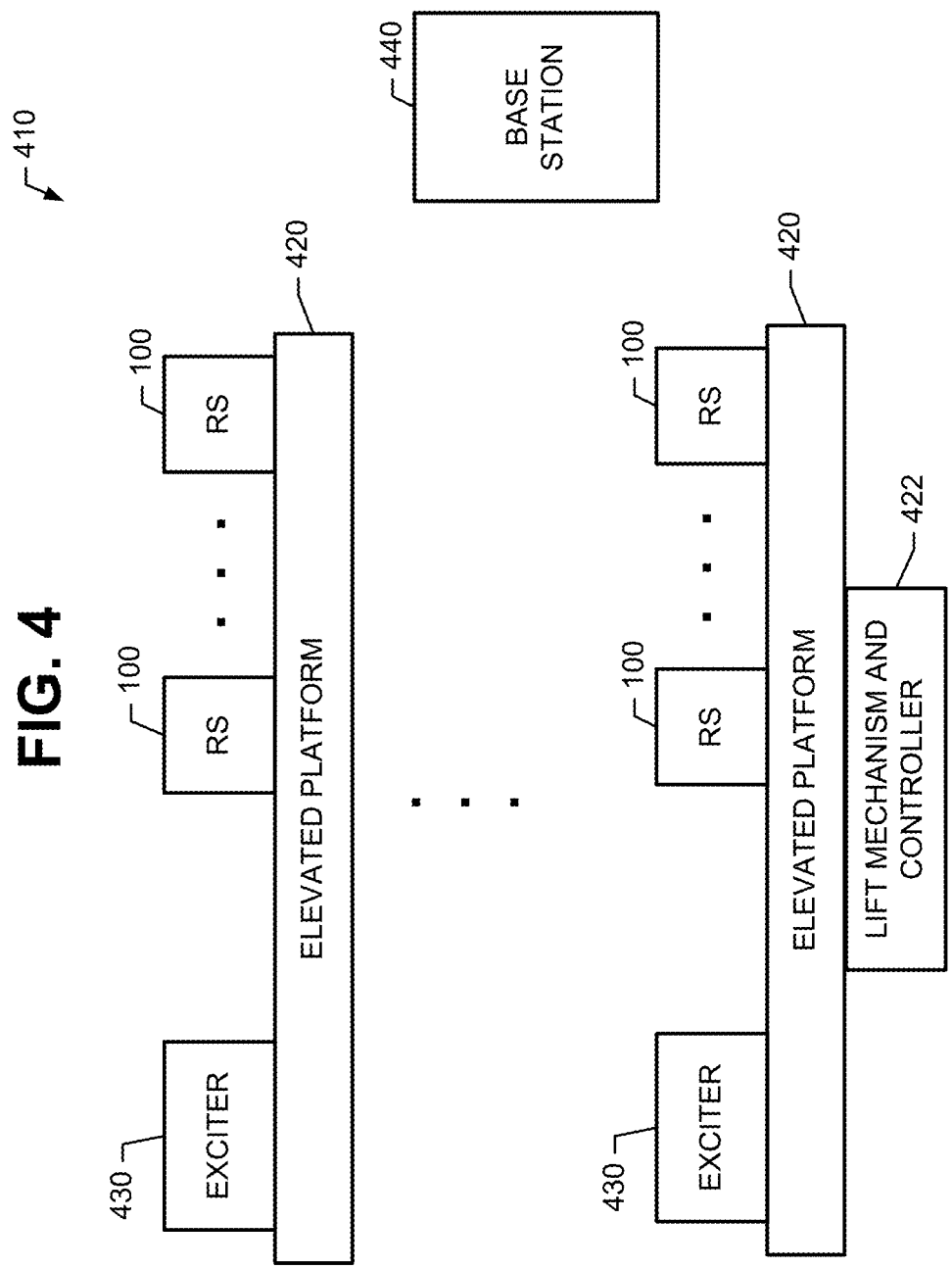
FIG. 4 is an illustration of an elevated platform system.

Reference is now made to FIG. 4, which illustrates a platform system 410 including one or more elevated platforms 420. An elevated platform 420 such as catwalk or scaffolding (or even a beam of a bridge or building under construction) may have a fixed height, whereas an elevated platform such as a lift platform may be raised and lowered by a lift assembly (e.g., scissor lift, boom lift). A lift platform may include a control unit operable for changing its elevation. If the platform system 410 includes multiple lift platforms, each lift platform may be designed to operate independent of the other lift platform(s).

The platform system 410 further includes an exciter 430 associated with each elevated platform 420. Each exciter 430 wirelessly broadcasts a unique exciter identifier. The exciter broadcast may be continuous. The unique identifier is broadcasted within the confines of the associated elevated platform 420. Transmit power and gain of each exciter 430 may be limited to prevent overlap with broadcasts from other exciters 430 associated with nearby platforms 420. Thus, the exciter 450 identifier also identifies its associated platform 420.

The platform system 410 further includes at least one restraining system 100 onboard each elevated platform 420. Each restraining system 100 is configured to arrest a fall from an elevated platform 420. An exciter 430 wirelessly broadcasts its unique identifier to the RFID tag of each restraining system 100 onboard the associated elevated platform 420.

Figure 5:
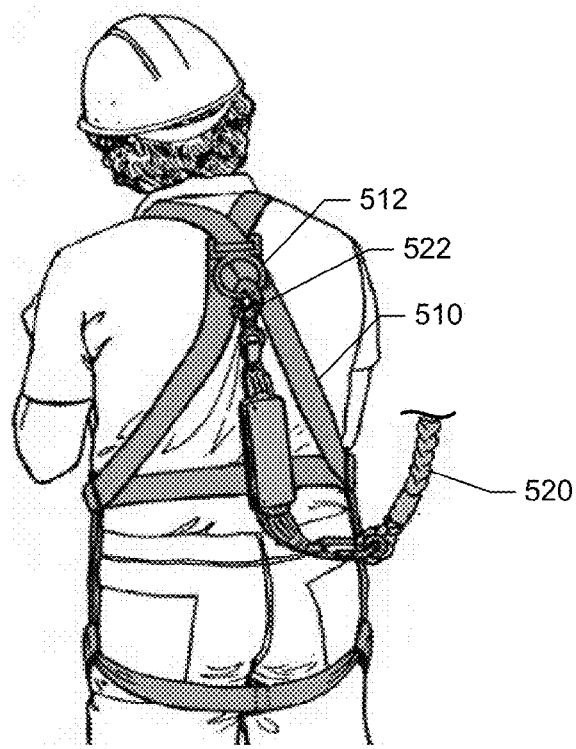
FIG. 5 is an illustration of a restraining device for use with the elevated platform system.

Reference is made to FIG. 5, which illustrates an example of a restraining device 110 for the platform system 410. The restraining device 110 includes a safety harness 510 having a ring 512, and a lanyard 520 having a free end that terminates in a snap hook 522.

The passive RFID tag 120 (not shown in FIG. 5) may be attached (e.g., epoxied) to the snap hook 522. The reader 130 (not shown in FIG. 5) may be carried by the safety harness 510, within a few inches of the ring 512. In some embodiments, the safety harness 510 may be worn over a suit, and the reader 130 is secured to the suit, proximate the ring 512.

The reader 130 is configured to detect the RFID tag 120 when the snap hook 522 is interlocked with the ring 512. Operating frequency of passive RFID communication is typically 13 MHz, 433 MHz, or 900 MHz.

Figure 6:
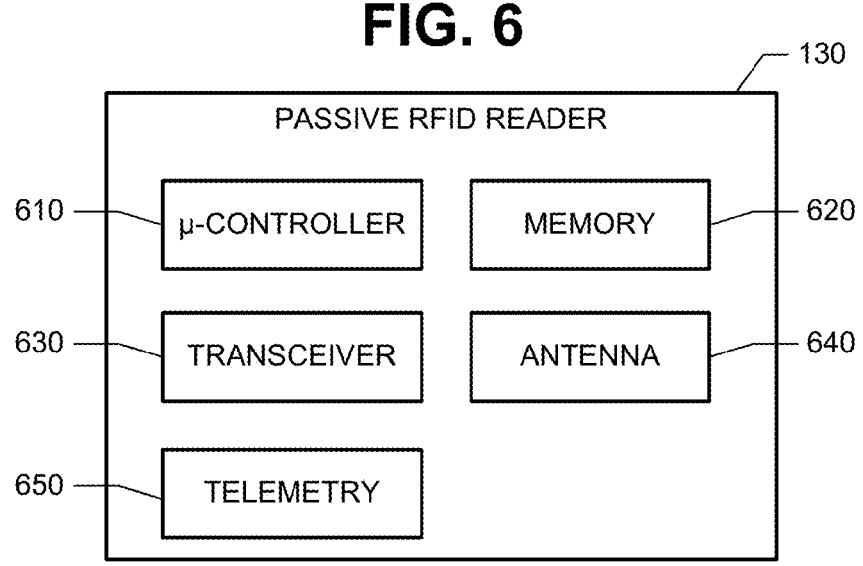
FIG. 6 is an illustration of a reader for the system of FIG. 4.

Reference is now made to FIG. 6, which illustrates an example of an RFID reader 130 for the platform system 410. The reader 130 includes a processor such as an embedded microcontroller 610, machine-readable memory 620, a transceiver 630, and an antenna 640. The reader 130 may be battery-powered.

The memory 620 stores executable code for causing the reader 130 to interrogate the tag 120, receive any transmissions from the tag 120, raise an interlock signal when the tag 120 is detected, and lower the interlock signal when the tag 120 is not detected.

The reader 130 further includes a telemetry module 650 for receiving the exciter broadcast. The telemetry module 650 may communicate with the exciter 430 via a low frequency communication (e.g., 125 kHz). The telemetry module 650 has an identifier that may also be used as a reader identifier. The executable code stored in the memory 620 also causes the microcontroller 610 to read the broadcasted exciter identifier and generate a status signal indicating the exciter identifier, the reader identifier, and an interlock status (that is, whether the ring 512 of the safety harness 510 is secured to the snap hook 522 of the lanyard 520).

The microcontroller 610 sends the status signal to the telemetry module 650, which broadcasts the status signal. The status signal may be broadcasted at a frequency that does not interfere with the exciter broadcast and the RF communication. For instance, the telemetry module 650 may broadcast the status signal via WiFi or Ultra Wide Bandwidth (UWB).

Returning to FIG. 4, the elevated platform system 410 further includes a base station 440 for receiving the broadcasted status signals from the readers 130. The base station 440 may take appropriate action in response to the status signals.

As a first example, the base station 440 sounds an alarm or generates a notification in the event any of the readers 130 are broadcasting a non-interlock status. As a second example, if a person attempts to jump from one platform to another, the reader 130 carried by that person will detect a different exciter identifier, and broadcast a status signal indicating the different exciter identifier. In response, the base station 440 generates a notification.

As a third example, an elevated platform 420 includes a lift mechanism and controller 422, which communicates with the base station 440. If the base station 440 receives a status signal indicating a non-interlock status on the elevated platform 420, the base station 440 may cause the controller 422 to disable the lift mechanism and thereby prevent the elevated platform 420 from being raised or lowered.

The use of RFID tags offers advantages other than detecting interlock status. The base station 440 may use the status signals to report in real time the number of workers on each elevated platform 420. This information may be used to determine whether each elevated platform 420 is overcrowded. This information may also be used by the base station 440 and/or lift controller to control the rate of descent and ascent of each elevated platform 420.

One particular application for the elevated platform system 410 is the painting of an aircraft. A commercial aircraft may be painted in a paint hanger equipped with a number of moveable elevated platforms 420 known in the industry as "crane stackers." Each crane stacker 420 may include a trolley, mast, platform and controller 422. The trolley is moveable along an overhead bridge. The base station 440 may communicate with the controller 422 of each elevated platform 420 to position the platforms around the aircraft and also to control the elevation of each elevated platform 420.

FIG. 7 illustrates a method of using the platform system 410 to paint commercial aircraft. At block 710, the painters fetch safety harnesses from a designated storage location. Each harness is assigned to a specific painter, and the reader that it carries has a unique identifier. Thus, each reader identifier also corresponds to a painter.

At block 720, each painter puts on a safety harness. As a safety harness is put on, the reader that it carries starts continuously broadcasting a status signal to the base station. At this stage, the status signals only identify the painters who have put on safety harnesses.

At block 730, the painters step onto their assigned stackers. The exciter associated with a stacker continuously broadcasts a unique exciter identifier. As a painter steps onto an assigned stacker, the reader receives a broadcast from the stacker's exciter and updates the status signal to also indicate the broadcasted exciter identifier.

At block 735, the base station determines whether the stackers are correctly populated. The base station may be aware of the painter assignments to each stacker. That is, the base station may be aware of the number and identify of painters who should be on each stacker at any given time. And since each reader is associated with a painter, and since each exciter is associated with a stacker, the status signals may indicate the number and identify of those painters who are actually on the stackers at any given time.

At block 740, the painters interlock their safety harnesses with free ends of lanyards. Those readers detecting the RFID passive tags will update their status signals to indicate an interlock condition. Now the status signals also identify the painters who have secured their safety harnesses to the assigned stackers and those who have not.

At block 750, the base station processes the status signals to determine whether all safety harnesses are interlocked with lanyards. If a status signal indicates that a safety harness is not interlocked, the base station may immediately direct appropriate actions to a specific stacker and a specific person on the stacker.

At block 760, the base station communicates with the stacker controllers and enables those stackers that have satisfied all initial safety conditions. Each enabled stacker can controls its lift mechanism to raise its platform.

At block 770, as the aircraft is being painted, the base station continually processes the status signals to ensure that safe work conditions are being maintained. For instance, the base station ensures that none of the painters detaches their safety harness from a lanyard. The reader identifiers may also be used to infer the amount of time that each painter spends working on the stacker. This additional information may be used to enhance worker safety, for example, by identifying possible fatigue conditions.

At block 780, a painter may move from one stacker to another to paint a different part of the aircraft. During this time, the reader carried by that painter is still continually broadcasting a status signal. When the painter detaches the lanyard, the status signal indicates that the lanyard has been detached. As the painter moves to a different stacker and the reader receives a broadcast from a different exciter, the status signal identifies the new stacker. As the painter attaches the safety harness to a new lanyard, the status signal indicates an interlock condition.

At block 790, after work has been completed, the stackers lower their platforms to ground level. The painters detach their safety harnesses from the lanyards, step off the platforms, and return their safety harnesses to storage.

The invention claimed is:

1. A platform system comprising:
   a plurality of elevated platforms;
   a plurality of platform identification devices, each identification device associated with one of the platforms, each identification device wirelessly broadcasting a signal at a first frequency within the confines of its associated platform, the signal including a unique identifier of the associated platform; and
   a plurality of restraining systems, each restraining system including first and second interlockable parts, an RFID tag attached to the first part, and an RFID reader coupled to the second part for near field detection of the tag within a prescribed range of the second part, the RFID reader including a telemetry module for receiving a unique platform identifier from one of the identification devices and for broadcasting a status signal to a base station at a second non-interfering frequency with the identification devices.

2. The platform system of claim 1, wherein the elevated platforms are crane stackers.

3. A paint hangar comprising the platform system of claim 1.

4. The paint hangar of claim 3, wherein the elevated platforms are crane stackers.

5. A platform system comprising:
   a platform;
   a device onboard the platform, for wirelessly broadcasting a signal at a first frequency that identifies the platform with a unique identifier, power and gain of the signal tailored so the signal is broadcast within the confines of the platform; and
   a restraining system including a plurality of first and second interlockable parts, an RFID tag attached to each first part, and an RFID reader coupled to each second part performing near field detection of the tag to determine interlock status of the first and second parts, the RFID reader including a telemetry module for receiving the unique platform identifier and for broadcasting a status signal to a base station at a second non-interfering frequency with the device onboard the platform, the status signal indicating the unique platform identifier and the interlock status.

6. The platform system of claim 5, wherein the reader performs near field detection within a prescribed range of a few inches of the second part.

7. The platform system of claim 5, wherein the reader continues the near field detection after the parts have been interlocked.

8. The platform system of claim 5, wherein the restraining device further includes an article of clothing that carries the passive reader and the second part.

9. The platform system of claim 5, wherein the restraining device further includes a safety harness that carries the passive reader and the second part.

10. The platform system of claim 9, further comprising a lanyard having a free end that carries the first part.

11. The platform system of claim 5, wherein the reader includes a processor programmed to raise an interlock signal when the reader detects the tag.

12. The platform system of claim 11, wherein the processor is further programmed to lower the interlock signal once the reader does not detect the tag.

13. The platform system of claim 5, further comprising at least one additional restraining system, wherein the RFID reader of each restraining system onboard the platform is configured to read the broadcasted platform identifier and broadcast a status signal indicating the platform identifier and the interlock status.

14. The platform system of claim 13, wherein the elevated platform includes a lift mechanism; and wherein the base station disables the lift mechanism when at least on status signal indicates a non-interlock status.

* * * * *

UNITED STATES PATENT AND TRADEMARK OFFICE
CERTIFICATE OF CORRECTION

PATENT NO. : 9,477,858 B2
APPLICATION NO. : 14/040533
DATED : October 25, 2016
INVENTOR(S) : Al Salour et al.

It is certified that error appears in the above-identified patent and that said Letters Patent is hereby corrected as shown below:

In the Claims

Column 7, Line 15, delete the word "passive".

Column 7, Line 18, delete the word "passive".

Column 8, Line 16, delete the word "on" and substitute therefor --one--.

Signed and Sealed this
Seventeenth Day of January, 2017

Michelle K. Lee
*Director of the United States Patent and Trademark Office*